United States Patent [19]

Solbach et al.

[11] 3,998,732

[45] Dec. 21, 1976

[54] METHOD FOR PURIFYING WATER OF ORGANIC COMPOUNDS NOT READILY BIODEGRADABLE

[75] Inventors: Hermann Solbach, Ravensburg, Weissenau; Hans Foerster, Essen, both of Germany

[73] Assignee: Feldmuehle Anlagen- und Produktionsgesellschaft mit beschraenkter Haftung, Duesseldorf-Oberkassel, Germany

[22] Filed: Oct. 16, 1975

[21] Appl. No.: 623,209

[30] Foreign Application Priority Data

Oct. 19, 1974 Germany .......................... 2449756

[52] U.S. Cl. .................................. 210/32; 162/29
[51] Int. Cl.² ...................................... B01D 15/06
[58] Field of Search ............. 210/41, 40, 18, 30 R, 210/32; 162/16, 29; 423/628

[56] References Cited

UNITED STATES PATENTS 2,758,070  9/1956  Yurko .......................... 210/40 X

OTHER PUBLICATIONS

T. Ploetz, Das Papier (Darmstadt) 1974, 28(10A) 39–43.

*Primary Examiner*—Frank A. Spear, Jr.
*Assistant Examiner*—E. Rollins Cross
*Attorney, Agent, or Firm*—Hans Berman

[57] ABSTRACT

The waste water of a sulfite pulp mill containing lignin and lignin derivatives which are not bio-degradable is purified by contact with a fixed bed of granular, porous $\gamma$-alumina having a particle size of 0.5–10 mm and a specific surface area of at least 140 m²/g.

9 Claims, 2 Drawing Figures

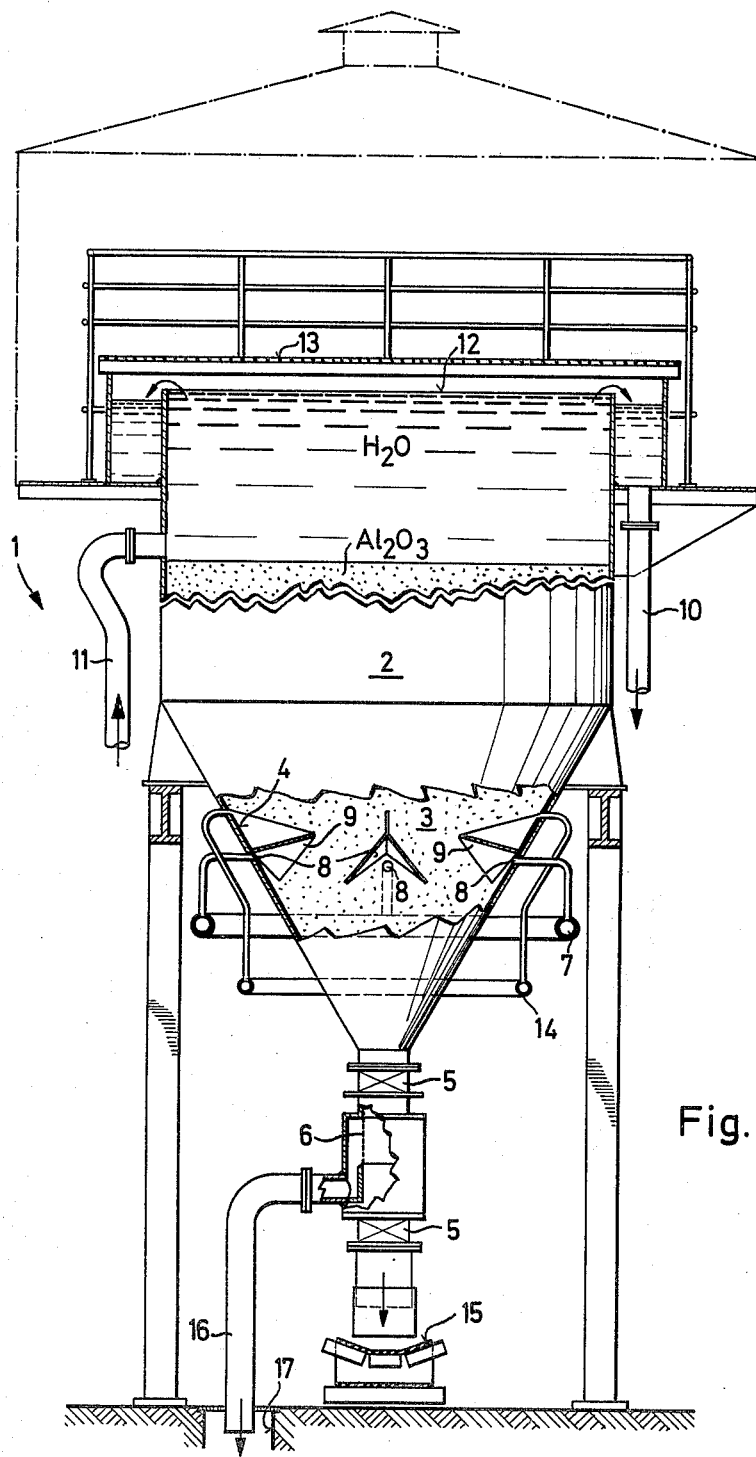

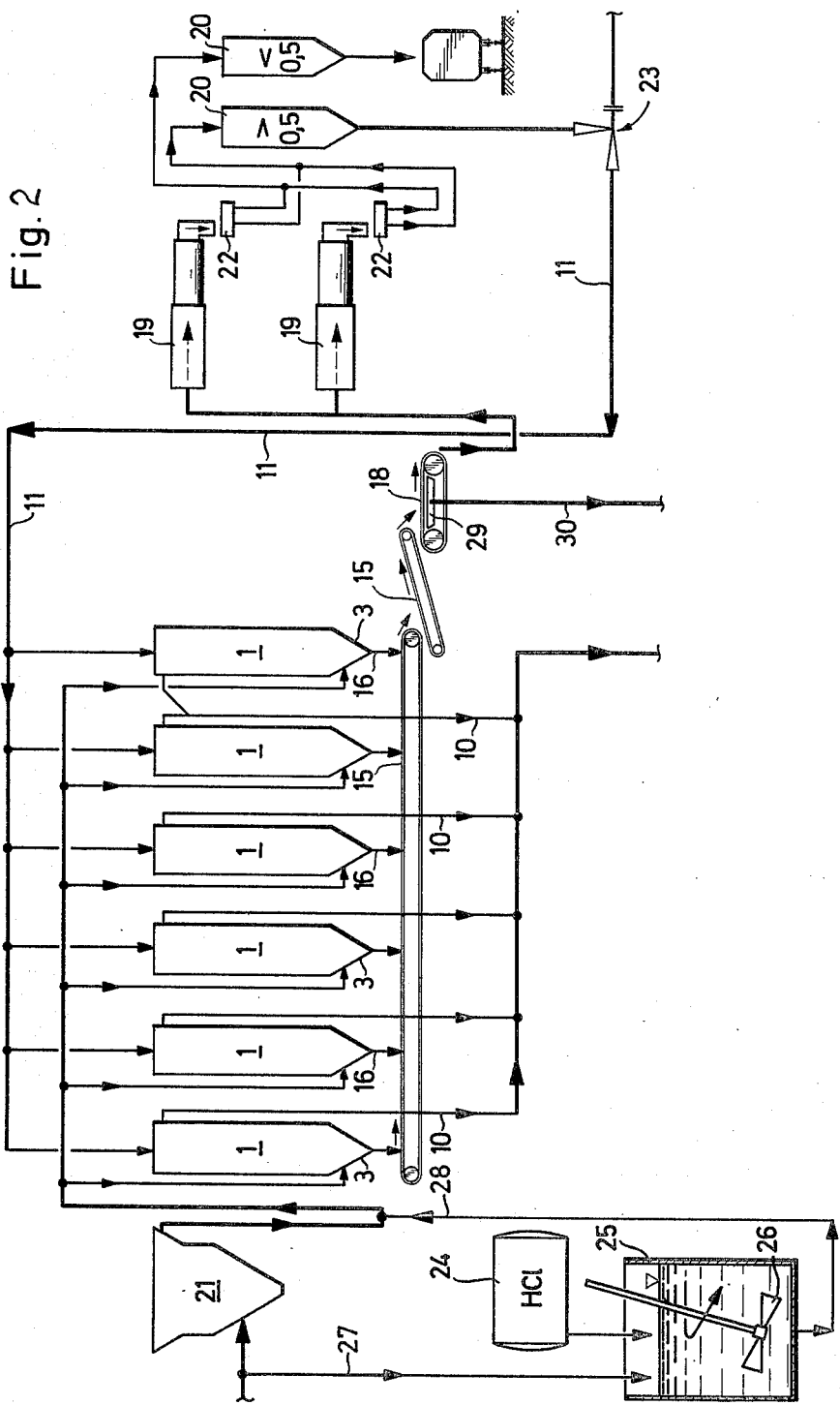

METHOD FOR PURIFYING WATER OF ORGANIC COMPOUNDS NOT READILY BIODEGRADABLE

This invention relates to the purification of waste water, and particularly to the removal of organic compounds which are not readily bio-degradable from water by adsorption on granular γ-alumina, the latter term being used broadly to encompass forms of $Al_2O_3$ referred to by some workers in this field as η-alumina.

It has been proposed in the commonly owned U.S. application Ser. No. 461,613, filed on Apr. 17, 1974, to purify waste water, particularly the waste water discharged from paper and pulp mills by contact with granular γ-alumina, such waste waters containing substantial amounts of organic materials, particularly lignin derivatives, including lignosulfonic acid, and their decomposition products having a molecular weight greater than 6,000 as a major component, the impurities being adsorbed by the alumina. In order to maintain as great an alumina surface as possible in contact with the water, it was proposed to employ alumina of a grain size of 30 to 100 μ which can be held in suspension in the waste water by gentle stirring.

While the known process permits the fine grains to absorb a large amount of impurities, and thereby is very effective in terms of the amount of alumina employed, the apparatus required is relatively expensive to build and operate. It is necessary to arrange several adsorption vessels in series and to convey the waste water as well as the alumina between the several vessels. Due to the abrasive nature of the adsorbent, wear of movable parts in the necessary pumps is high enough to increase the cost of the known process significantly.

For adequate contact of the waste water with a sufficient amount of γ-alumina, it is necessary to employ a multiplicity of adsorption columns in which a maximum concentration ratio of γ-alumina to water must not be exceeded. Because of the turbulence which keeps the granular adsorbent in suspension, it is not possible to hold the alumina grains in a fixed position. A well defined concentration gradient of grains and waste water cannot be achieved, and this requires the series connection of several columns.

It is the primary object of this invention to improve the process disclosed in the earlier application, and to provide conditions of operation which make most economical use of materials and equipment and simplify the control of the process.

According to one important aspect of this invention, the granular γ-alumina employed as an adsorbent has a grain size of 0.5 to 10 mm and a specific surface area greater than 140 $m_2/g$. These properties need not be present in the adsorbent when first employed, but may be developed during thermal regeneration after a first adsorption step. Actually, the aluminum oxide hydrate generally referred to as Boehmit may be charged to an adsorption column of the invention and converted to γ-alumina after preliminary service.

Because of the use of a porous γ-alumina having an approximately cellular or sponge-like structure, it is permissible to employ relatively coarse alumina grains without loss of the desired large specific surface area. The coarse grains may be employed in a fixed bed so that a large amount of γ-alumina may be accomodated in a single reactor or column, and the use of series-connected multiple columns is avoided. In a fixed bed process, alumina need not be conveyed by pumping between several columns, and the elimination of the otherwise necessary pumps reduces the operating cost.

The selected grain size of the porous alumina is essential for successful operation of the method of the invention because it avoids clogging of the passages between the grains, yet still provides an adequate adsorbent surface. The coarse grains also may be drained of water more effectively than finer grains, so that residual water may be removed from the coarse grains by evaporation at lower fuel cost prior to regeneration than from the fine grains of the earlier application.

Best results are generally achieved with γ-alumina grains having a particle size of 3 to 6 mm. While grains smaller than 3 mm have a larger specific surface area than coarser grains, this advantage is largely balanced by the clogging tendency of the narrow passages between grains. At a grain size greater than 6 mm, the available, specific surface area drops rapidly with increasing diameter.

The preferred grade of γ-alumina has a specific surface area of at least 140 $m_2/g$ and a pore volume of at least 0.35 $cm^3/g$. The pore volume and the specific surface area are directly related to the amount of waste water capable of being treated per unit weight of adsorbent. Considered from this point of view, Boehmit whose specific surface area is between 180 and 240 $m^2/g$ would appear to be superior to other materials, but Boehmit cannot be regenerated by removal of organic contaminants by combustions, and thus cannot be considered.

γ-Alumina is practicaly completely stripped of organic contaminants by heating in air for 40–60 minutes at 500°–600° C. The temperatures and times indicated are quite critical in that the organic matter cannot be removed adequately at lower temperature or in a shorter period, and the specific surface area is reduced by excessive times and temperatures during regeneration.

The cost of the process is affected greatly by the mechanical strength of the alumina particles, and they should have a breaking strength greater than 2.5 kg, the breaking strength being determined by compressing a grain of adsorbent between a flat anvil and the radial end face of a metal rod, and by applying increasing pressure to the rod until the grain fractures. Unless stated otherwise, values of breaking strength indicated hereinbelow were determined on approximately spherical grains having a diameter of approximately 2 mm.

A high breaking strength is essential for avoiding wear of the grains by abrasion during handling, as during removal of the loaded adsorbent from a column, its regeneration, and the return to the column. Particles worn down to a diameter of 0.5 mm or less must be screened from the adsorbent charge to avoid clogging of the column by fines produced by further breakdown of the small grains.

Breaking strength is closely related to $Al_2O_3$ content. For adequate strength of alumina grains having the necessary porosity, an $Al_2O_3$ content of more than 97% is necessary. Strength increases rapidly with further reduction in the amount of impurities present so that grains containing more than 99% $Al_2O_3$ on a bone dry basis are generally preferred, the balance consisting essentially of minor amounts of silicon dioxide, iron oxides, titanium oxide, and sodium oxide.

The flow velocity at which the waste water to be purified is passed through an adsorbent column has a major influence on the effectiveness of the process. It should be between 3 and 10 meters per hour, best results usually being obtained at values near 6 meters per hour, all velocity values being based on the column cross section free from adsorbent grains. The output of the column decreases with decreasing velocity and becomes uneconomical below 3 meters per hour. At velocities higher than 10 m/hr., the adsorbent grains may be entrained by the liquid and damaged by collision with other grains.

The contact between the water to be treated and the alumina grains is to be maintained for 30 minutes to 2 hours under the preferred conditions outlined above, and the contact time varies with the nature of the waste water. The heavily contaminated water discharged from the bleaching stage of a sulfite pulp mill requires a treating time of approximately 90 minutes. Increasing the contact time beyond 2 hours does not produce measurable improvement, and a contact time of less than 30 minutes is ineffective with all waste waters requring the treatment of the invention and not processed more effectively by other methods.

The reactor vessels or columns employed in performing the method or process of the invention may be charged with dry γ-alumina grains by means of a bucket conveyor, screw conveyor, or belt conveyor, but it is preferred to introduce the adsorbent into a reactor vessel while suspended in liquid. The suspension is formed by adding dry, granular γ-alumina to a pumped stream of water so that the abrasive alumina does not pass through the pump and does not cause wear of the pump. The liquid prevents abrasive interaction of the particles and is readily removed from the charged column through the discharge spout for purified water. It is readily possible to feed freshly regenerated alumina in this manner to an adsorption column without taking the column out of operation, and continuous supply of fresh adsorbent would normally be preferred. It is not practical, however, continuously to withdraw spent adsorbent from an operating column, and it is more economical to interrupt operation of a column and to withdraw a portion of the adsorbent charge from the column while the stream of waste water is passed through another column arranged in parallel. This arrangement permits replacement of the alumina charge at closely spaced intervals, and constant operating conditions, particularly a reasonably constant flow resistance of each column, can be maintained over an extended period of time.

The adsorbent carrying contaminants removed from the waste water may be withdrawn from the column together with water as a suspension or sludge which is transferred to a filter by means of a water jet pump installed below the column. It is preferred, however, to withdraw spent adsorbent from the column substantially separately from liquid. For this purpose, the bottom of the column is disconnected from the waste water supply, and the water still in the column is slowly drained by gravity. The rate of water discharge should be low enough to prevent fines accumulated on the adsorbent grains near the bottom inlet from being flushed from the grains by the discharged water. The grains of γ-alumina may then be dumped on a conveyor and transferred to a filter press or the like for removal of residual water which is returned to the waste water supply. Removal of as much water as possible by mechanical pressure is essential to low energy consumption in the subsequent thermal regeneration step.

The regenration temperature at which the adsorbed organic contaminants are volatilized by reaction with ambient atmospheric oxygen is between 500° and 600° C, a temperature of 560° C being most advantageous in most instances when paper and pulp mill wastes are to be purified. The organic matter adsorbed on the alimina is mainly converted to coke at temperatures below 500° C, and the porous γ-alumina undergoes undesirable structural changes at temperatures above 600° C. Loss of specific surfaces area is observed at temperatures not much above 600° C, and conversion to inactive γ-alumina occurs at higher temperatures, as is known in itself.

The regenerated granular material should then be cooled or permitted to cool to a temperature below 100° C. Although γ-alumina is normally unaffected by sudden temperature changes, it appears that water penetrating into the pores of the adsorbent grains is evaporated there more rapidly than the generated steam can escape so that the porous structure bursts under the steam pressure. Loss in breaking strength is safely avoided by keeping the alumina out of contact with water until sufficiently cooled.

With the γ-alumina grains described above arranged in a fixed bed, it has been found most advantageous to keep the pH of the entering waste water at a value below 4.5. The mechanism which accounts for the beneficial results observed at such pH values is not yet established. If it be assumed that the adsorption of organic contaminants on γ-alumina involves hydrogen bonding, the presence of mobile hydrogen ions is necessary. A typical contaminant in the waste water from a sulfite pulp mill is a lignosulfonic acid of the formula $R-SO_3H$. The dissociation constant of such an acid is assumed to have an important and perhaps controlling influence on the ability of the compound to be adsorbed and to be dependent on the pH value of the aqueous medium. An equilibrium is set up according to the formulas:

$$R-SO_3H \rightleftarrows R-SO_3^- + H^+ \quad (1)$$

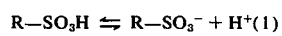
Acidic ← pH 4–4.5 → basic

Investigation of the adsorption behavior of waste water discharged from the bleaching operation of a sulfite pulp mill indicates that the pH value of the waste water prior to adsorption treatment with γ-alumina should not exceed 4 or at most 4.5, that is, the adsorption process is favored by operating under the conditions represented by the left side of each of the above formulas.

It has been established that the amount of organic matter adsorbed decreases with increasing pH value, and that practically the entire organic contaminants remain in the aqueous medium when the latter is strongly alkaline. A significant improvement in the adsorption is not to be expected from adjustment of the waste water to a pH much below 4, and none has been observed under the other preferred conditions of operation outlined above.

Apparatus preferred for performing the method of this invention includes at least one reactor vessel equipped with a supply line for the waste water, a discharge line for the purified water, devices for adding and withdrawing adsorbent, and regenerating equipment for spent adsorbent. The preferred reactor vessel is an upwardly open column having a conically tapering bottom, the apex angle of the conical bottom being smaller than 70°. The downwardly tapering bottom leads the spent adsorbent to the withdrawing device for the same. The small apex angle of the bottom permits discharge of the bottom layer of spent adsorbent without mixing the exhausted material with a superposed layer of still effective alumina. Any arch formed in the granular material during discharge is readily broken up by means of a jet of compressed air without mixing the several layers.

Undisturbed discharge of adsorbent is further facilitated by a smooth and acid-resistant lining on the tapering bottom portion of the column. If the basic material of column construction is steel, it may be covered with a layer of ceramic enamel or of rubber which not only extends the useful service life of the column by resisting acid corrosion, but facilitates release of the adsorbent during discharge.

A slide valve arranged at the lowermost part of the column is preferably equipped with a water separator which permits the reactor or column to be drained of waste water without simultaneously discharging the adsorbent which may later be withdrawn in an almost dry condition.

The preferred regenerating equipment includes a rotary kiln which is preferred over other furnaces because it permits continuous regeneration at constant temperature.

Other features of this invention and many of the attendant advantages will readily be appreciated from the following detailed description of preferred embodiments when considered in connection with the appended drawing in which:

FIG. 1 shows an adsorption column of the invention and associated devices in partly sectional front elevation; and FIG. 2 is a flow sheet illustrating a water treating system of the invention including six columns of the type shown in FIG. 1.

Referring initially to FIG. 1, there is seen an adsorption column or reactor 1 whose main portion 2 is an upright cylinder of about 5 m diameter, and whose bottom portion 3 tapers conically downward at an apex angle of about 60°. A rubber lining 4 covers the inner walls of the reactor 1, and the reactor is filled over most of its height with granular, porous γ-alumina $Al_2O_3$ having an initial particle size of 3–5 mm and retained in the reactor 1 by a slide valve 5 at the lowermost part of the bottom portion 3. When the valve 5 is opened, a portion of the alumina charge may be dropped into a water separator 6 equipped with a drain 16 and a discharge valve 5' under which a belt conveyor 15 is arranged.

Waste water is fed to the conical bottom portion 3 from an annular manifold 7 through four openings 8 in the reactor wall. Baffles 9 are arranged over the openings to distribute the water over the reactor cross section and to prevent channeling. The effective height of the reactor from the openings 8 to an overflow 12 at its open top is 10 m, the top surface of the alumina being located 2 m below the overflow. The purified water is withdrawn from the overflow 12 through a line 10. A grating 13 above the overflow may carry a workman for inspection and maintenance operations. A pipe 11 enters the main reactor portion 2 at the upper alumina surface. Compressed air may be blown into the bottom part 3 from an annular manifold 14. Water discharged from the separator 6 through a drain pipe 16 is collected in a conduit 17.

In the water treating system diagrammatically illustrated in FIG. 2, six reactors 1 are arranged for parallel flow of waste water therethrough, individual reactors being capable of being shut off by valves, not specifically shown.

Most of the raw water to be treated enters a settling tank 21 and is distributed from there to the several manifolds 7. A portion of the raw water is fed through a by-pass 27 to a mixing tank 25 equipped with a stirrer 26 to which concentrated hydrochloric acid is admitted from a tank 24 at a rate to maintain a desired pH in the processed water when the hydrochloric acid diluted to 5% in the tank 25 is led through a line 28 into the main stream of raw water pumped from the settling tank 21 by a non-illustrated pump. The purified water discharged from the several reactors 1 through the lines 10 is collected and may be purified further by microbial action if necessary.

The raw water flows upward in each reactor, and the portion of the alumina in each bottom portion 3 is saturated with adsorbed organic matter before much of the adsorbent in the main portion 2 is loaded. A reactor 1 reaching this condition is shut off from the raw water supply for partial release of its alumina charge through the opened valve 5 while much of the remaining water in the reactor 1 is drained through the separator 6 into the conduit 17 from which it is returned to the settling tank 21 in a non-illustrated manner. Enough alumina is then dropped through the valve 5' on the conveyor 15 to remove most of the organic matter accumulated in the reactor. The spent alumina is dewatered on a perforated conveyor belt 18 traveling over a suction box 29 connected to a vacuum line 30. The moist, contaminated adsorbent is transferred from the belt 18 to two rotary kilns 19 in which the organic matter is volatilized in air at about 560° C. The regenerated alumina is classified on screens 22 into fractions greater and smaller respectively than 0.5 mm, and the two fractions are stored in bins 20, the fines to be utilized for other purposes, and the larger grains being introduced into the discharge pipe of a water jet pump 23 operated with purified or pure water. The stream of alumina grains suspended in water is fed through the pipe 11 to a reactor 1 whose alumina level has fallen below the normal height shown in FIG. 1 by withdrawal of spent alumina from its bottom portion 3. Any arch formed in the alumina sliding downward toward the valve 5 in the reactor bottom 3 may be broken up by compressed air from the manifold 14.

In an actual embodiment of the invention whose principal features are illustrated in FIGS. 1 and 2, waste water is fed to each operating reactor at a vertical flow rate of 6 m/hr, as measured in the main portion 1 above the alumina level. The adsorbent charge in each reactor weighs about 18 metric tons.

The following Examples are further illustrative of this invention.

EXAMPLE 1

Three series-connected adsorption columns were charged with γ-alumina containing 92.0 ± 0.7% $Al_2O_3$ and 7.5 ± 0.7% matter volatile at 1100° C, impurities being limited to maximum values of 0.02% $SiO_2$, 0.030% $Fe_2O_3$, 0.003% $TiO_2$ and 0.60% $Na_2O$. The material was white to pinkish and had a density of 2.8 g/cm³, a bulk density of 0.9 g/cm³, a grain size of 1–5 mm, and a breaking strength of at least 2.5 kg for grains of 1–1.5 mm, 8 kg for grains of 3 mm, and 15 kg for grains of 5 mm.

The combined height of the three adsorption zones was 3 m, the flow velocity of the liquid was 2 m/hr., the dwell time of the water averaged 2 hours, and approximately 10 kg γ-alumina was required for purifying one cubic meter of each of the two waste waters listed below. Waste water was passed sequentially through the three columns until the first column was exhausted. Operation then was interrupted, the adsorbent of the exhausted column was removed, regenerated, and returned to the same vessel which was then placed last in the water stream. Enough water was processed to require each adsorbent charge to be regenerated 15 times, and each of the two waste waters was purified for approximately one month. No loss in adsorbent capacity was observed after the 15th regeneration.

The two types of waste processed originated in the bleaching operations of a sulfite pulp mill. The raw waters were adusted with hydrochloric acid to pH 2–3 in order to maintain an effluent pH of 4–4.5. Other properties (average values over one month of operation) of the raw water (IN) and of the effluent (OUT) are listed in Table I.

The sharp reduction in B.O.D. and in total organic carbon (TOC) is characteristic of this invention.

EXAMPLE 2

The apparatus employed differed from that described with reference to Example 1 by its larger scale. It consisted of six reactors or columns of which five were operated in series while the contents of the sixth column were being regenerated so that continuous operation could be maintained. The fixed adsorbent bed in each column had a height of 1.50 m and consisted of approximately 20 kg γ-alumina of the same composition and grain size distribution as in Example 1.

The influence of process variables on the performance of the system was investigated. Four process conditions were tested and involved respective throughputs of 85, 100, 150, and 210 liters per hour, corresponding to average dwell times of 90, 77, 51, and 37 minutes and water velocities of 5, 6, 8.8, 12 meters per minute.

TABLE 1

| | Waste Water A | | Waste Water B | |
|---|---|---|---|---|
| | IN | OUT | IN | OUT |
| $KMnO_4$ mg/l | 1700 | 300 | 1863.6 | 160.6 |
| Color, mg Pt/l | 2550 | 375 | 4586.4 | 132.4 |
| Conductivity, μ mhos | 2870 | 2295 | 3271.6 | 2600 |
| Evap'n Res. (105° C), mg/l | 2565 | 2196 | 2598.3 | 1964 |
| Calc'n Res. (600° C), mg/l | 1135 | 1100 | 1496.1 | 1298.4 |
| Hardness, °(German) | 32 | 32 | 28.9 | 32.4 |
| $SO_4$, mg/l | 385 | 97 | 201.8 | 47.2 |
| Cl, mg/l | 861 | 826 | 934.4 | 1006.8 |
| $SiO_2$, mg/l | | | 2.5 | 0.476 |
| TOC, mg/l C | | 380 | 150 | 403 | 137 |

The reduction in the B.O.D. of raw water closely similar to that used in Example 1 varied between 80% and 95%, best results being achieved at flow velocities of 5 to 8 m/hr. The purifying capacity of the alumina was approximately 6 to 10 kg alumina per cubic meter of raw water.

The pressure drop across each column showed an initial rapid increase, but grew only slowly thereafter until the alumina charge was spent. This is consistent with the assumption that the bed of granular material does not act as a filter, but that an accumulation of contaminants in the passages of the bed is caused by adsorption.

Even at a water velocity of 12 meters per minute, the alumina beds did not expand. In an alumina column 2 meters high and loaded with contaminants to its full capacity, the pressure drops did not exceed 4 m of water column.

The period at 550°–600° C necessary for fully regenerating granular, porous alumina of a particle size of 3 to 5 mm was 50 minutes. It dropped to 35 minutes for grains of 60 μ. After 45 minutes, alumina of the preferred grain size was only partly regenerated and its adsorption capacity was drastically reduced. Calcining for more than 50 minutes did not produce better adsorption.

What is claimed is:

1. A method of purifying contaminated waste water, from paper and pulp mills of organic impurities substantially not biodegradable which comprises contacting said waste water with granular, porous γ-alumina until said impurities are adsorbed on said alumina, said alumina having a particle size of 0.5 to 10 mm and a specific surface area of at least 140 $m_2$/g.

2. A method as set forth in claim 1, wherein said particle size is between 3 and 6 mm.

3. A method as set forth in claim 2, wherein the pores in said alumina have a volume of at least 0.35 $cm^3$/g.

4. A method as set forth in claim 3, wherein the particles of said alumina have a breaking strength of at least 2.5 kg.

5. A method as set forth in claim 4, wherein said alumina contains more than 97% $Al_2O_3$ on a bone dry basis.

6. A method as set forth in claim 1, wherein said waste water is contacted with said alumina by moving said water relative to said alumina at a velocity of 3 to 10 meters per hour.

7. A method as set forth in claim 1, wherein said alumina is stripped of adsorbed impurities after said contacting by heating in air at 500° to 600° C for 40 to 60 minutes.

8. A method as set forth in claim 1, wherein said waste water, prior to said contacting, is adjusted to a pH value below 4.5.

9. A method as set forth in claim 8, wherein said impurities include as a major component derivatives of lignin having a molecular weight greater than 6,000.

* * * * *